United States Patent [19]

Hahn

[11] Patent Number: 4,705,020

[45] Date of Patent: Nov. 10, 1987

[54] GAS COOKER

[76] Inventor: Linus K. Hahn, 3085 Alexis Dr., Palo Alto, Calif. 94304

[21] Appl. No.: 886,512

[22] Filed: Jul. 16, 1986

Related U.S. Application Data

[63] Continuation of Ser. No. 653,673, Sep. 21, 1984, abandoned.

[51] Int. Cl.⁴ .......................... F24C 3/00; A47J 31/00
[52] U.S. Cl. .................................... 126/41 R; 126/38; 126/39 R
[58] Field of Search ...................... 126/41 R, 38, 25 R, 126/39 R; 431/347, 348, 193

[56] References Cited

U.S. PATENT DOCUMENTS

| 824,477 | 6/1906 | Gandar | 126/41 R |
|---|---|---|---|
| 1,038,253 | 9/1912 | Williams | 126/41 R |
| 2,879,837 | 3/1959 | Downs | 431/347 X |
| 3,366,156 | 1/1968 | Belknap | 431/348 |
| 3,648,680 | 3/1972 | Hein | 126/38 |
| 3,799,142 | 3/1974 | Jensen | 126/39 J |
| 3,822,982 | 7/1974 | Du Perow | 431/193 X |
| 3,964,463 | 6/1976 | Dailey | 126/41 R |
| 4,105,013 | 8/1978 | Vache | 126/38 |

Primary Examiner—Larry Jones
Attorney, Agent, or Firm—Limbach, Limbach & Sutton

[57] ABSTRACT

An improved gas cooker of the type having a housing, a burner supported in the housing, and a fixture for supplying gas to the burner, the gas burner having a plurality of apertures through which gas can be emitted for combustion in the form of a flame. The improvement comprises a thermal deflective body which is positioned apart from the burner and in the vicinity of the apertures so that the heat is deflected in a direction toward the object to be heated. Also provided is a dual purpose container which has dimensions selected so that the housing and burner can fit therein to be transported, and conversely so that said container can be positioned in the vicinity of the burner when the gas cooker is operative.

10 Claims, 6 Drawing Figures

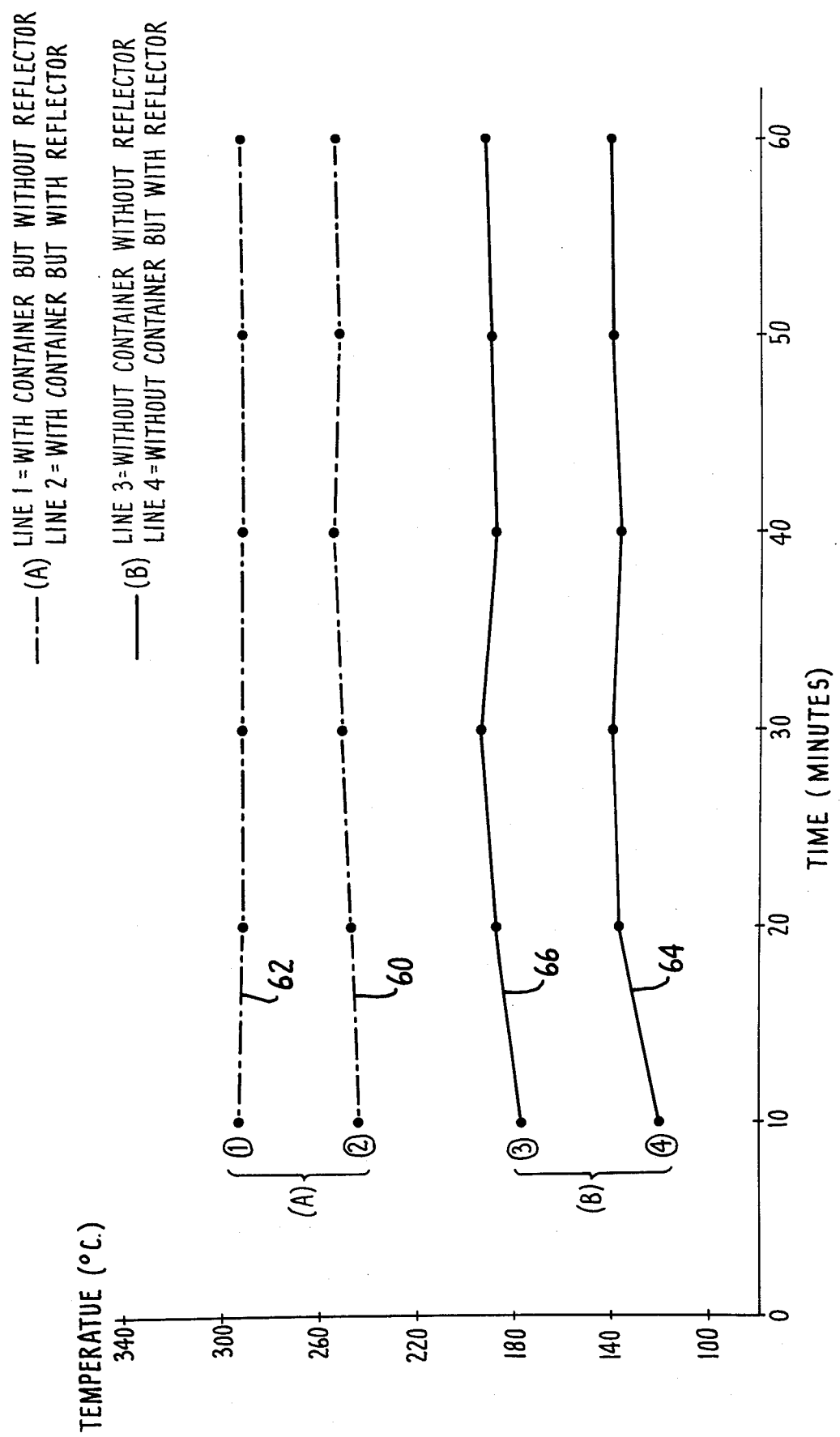

GAS COOKER

This is a continuation of Application Ser. No. 653,673, filed 9/21/84.

TECHNICAL FIELD

The present invention is directed, generally to cooking apparatus, and more particularly to a portable cooking apparatus having a highly efficient gas burner.

BACKGROUND ART

In the portable gas cooker area there are a number of gas cookers which provide a housing, a gas burner and gas supply/regulating fixtures by which a certain pressure gas can be provided to the gas burner. These gas cookers have suffered from a number of deficiencies. One such deficiency is low efficiency of heat transfer. For example, it has been found that in certain prior gas cookers having a BTU rating of greater than 40,000 units is typically not capable of boiling water when used outdoors in the presence of wind velocities of 10 miles per hour or more. Further, prior gas cookers have suffered from high housing temperatures. As a result, more attention is required to be paid to the higher heat resistive coatings applied to the housing as well as to the maintenance of a safe distance between the housing and any flammable materials.

A further disadvantage of prior gas cookers is that of excessive bulk and a resulting difficulty in transporting the cooker from place to place.

DISCLOSURE OF INVENTION

These and other problems of prior portable gas cookers are overcome by the present invention of an improved gas cooker of the type including a housing, a gas burner, and a gas regulator/supply fixture, wherein the gas burner has a plurality of ports from which gas is emitted and burned in the form of a flame. The improvement comprises heat deflecting means which are positioned apart from the gas burner and opposite the plurality of ports so that the thermal pattern which is emitted from the gas burner is deflected toward the object to be heated.

The preferred embodiment of the deflecting means includes a ring of material which provides a face transverse to the direction at which the flame is emitted from the ports of the gas burner Preferably, the face is positioned so that the tip of the flame pattern comes into contact with the face. Furthermore, it has been found that the deflecting means absorbs heat from the flame which thermal currents also move toward the object to be heated It has been found, when deflecting or reflecting means are provided about the gas burner, that the efficiency of the gas cooker is greatly increased, and that the surface temperature of the housing is at the same time significantly decreased.

Further in accordance with the present invention the improved gas cooker is provided with removably couplable legs and a container which has upper and lower portions, the width of the upper portion being greater than the width of the housing, and the width of the lower portion being less than the width of the housing. With such dimensions, the housing can be contained within the upper portion of the container, provide an easily transportable gas cooker, and on the other hand, the lower portion of the container can be supported within the gas cooker to support the object to be heated during the operation of the gas cooker.

It is therefore an object of the present invention to provide an improved gas cooker having an increased efficiency.

It is a further object of the present invention to provide improved gas cooker having a housing and a gas burner supported in the housing, including a heat deflecting surface which is positioned about the gas burner which causes the thermal pattern which is emitted from the gas burner to be deflected toward the object to be heated.

It is another object of the present invention to provide an improved gas cooker having the housing and the gas burner supported in the housing, and further including thermal deflecting means positioned about the periphery of the gas burner which means provide a face which is transverse to the direction with which the flame is emitted from the gas burner so that the tips of the flame preferably touches the deflector.

It is a still further object of the present invention to provide an improved gas cooker having a gas burner which is supported in a housing, and also including a ring positioned about the gas burner which deflects the heat toward the object to be heated, which ring is constructed of material which absorbs heat and produces additional thermal currents toward the object to be heated.

It is still another object of the present invention to provide an improved gas cooker having a gas burner supported in the housing and further including detachable legs and a container, wherein the container has an upper portion having a first diameter and a lower portion having a second diameter, and further wherein the first diameter is greater than the width of the housing, and the second diameter is less than the width of the housing.

These and other features, objectives and advantages of the present invention will be more readily understood upon consideration of the following detail description of certain embodiments of the present invention and the accompanying drawings

BRIEF DESCRIPTION OF DRAWINGS

FIG. 4 is a graphical illustration of the performance of a gas cooker with and without the heat deflecting means of the present invention.

BEST MODE FOR CARRYING OUT THE INVENTION

Figure 1:
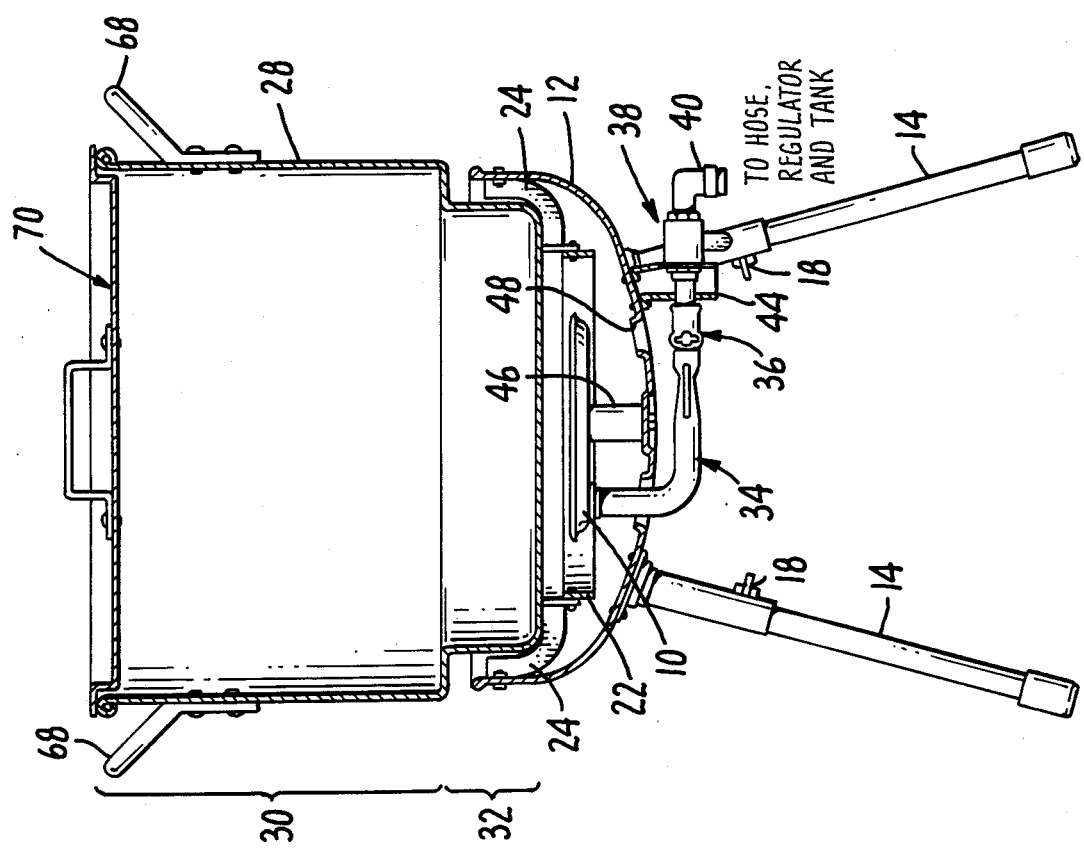
FIG. 1 is a perspective view of a gas cooker including the heat deflecting means.

Referring to FIG. 1 a gas burner 10 is supported in a housing 12. In turn, the housing is supported by removable legs 14. The legs 14 fit into sleeves 16 which sleeves are fastened to the housing. A screw and wing nut combination 18 passes radially through the sleeve 16 and leg 14 to secure leg 14 to sleeve 18.

Gas burner 10 is supplied with a certain pressure gas fuel by way of a gas supply fixture 20.

Positioned about gas burner 10 is a ring 22 of material. Ring 22 is supported by arms 24 which are fastened at one end to housing 12 and the other end to ring 22. An ignition hole 26 is provided in the side of housing 12 by which an ignition flame can be brought into close proximity of burner 10.

Figure 2:
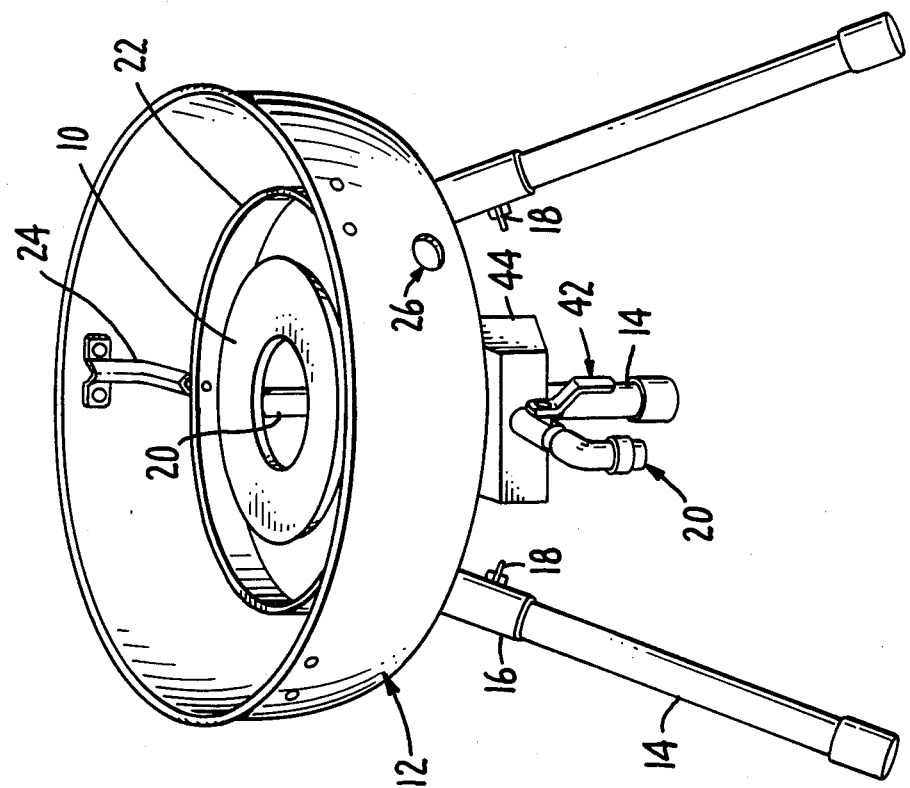
FIG. 2 is a cut-away view of the present invention including the carrying container which comprises a cooking pot.

FIG. 2 shows container 28 which serves the dual purpose of providing a transporting container for the gas cooker within which housing 12 and legs 14 can be fully contained, and also as a container for the objects to be heated. Container 28 has an upper portion 30 and a lower portion 32. The width or diameter of upper portion is selected to be greater than the width or diameter of housing 12. The diameter or width of lower portion 32 is selected to be less than the width or diameter of housing 12. In this manner 12 can fit fully within container 28 when it is desired to transport the cooker, and yet container 28 can be supported in the vicinity of burner 10 when the cooker is in operation.

In the preferred embodiment of the present invention housing 12 has a semi-ellipsoidal cross section and a cylindrical periphery. Arms 24 are preferably L-shaped so that the vertical portion thereof attaches to the housing 12 and the horizontal portion is affixed to ring 22. In the preferred embodiment of the present invention three such arms 24 are used, although additional arms can also be added for additional mechanical strength. As can be seen from FIG. 2 the diameter of lower portion 32 is selected so that lower portion 32 of container 28 can be nested between arms 24. Further it can be seen that preferably ring 22 is affixed to the horizontal ends of arms 24 so that ring 22 will be spaced apart from the bottom of container 28 when container 28 is resting on arms 24. This permits air and thermal circulation between container 28 and burner 10.

From FIG. 2 it can be seen that gas supply fixture 20 includes a venturi portion 34 which couples at one end to gas burner 10 and at the other end to an adjustable air shutter 36. The other end of air shutter 36 is connected to valve 38. The other end of valve 38 is in communication with a fitting attachment 44 to a gas hose, gas regulator, and gas tank (not shown). Lever 42, FIG. 1, controls the communication along the gas supply fixture. Gas supply fixture 20 is supported from housing 12 by bracket 44. Gas burner 10 is supported with respect to housing 12 by way of bracket 46, FIG. 2.

Figure 3:
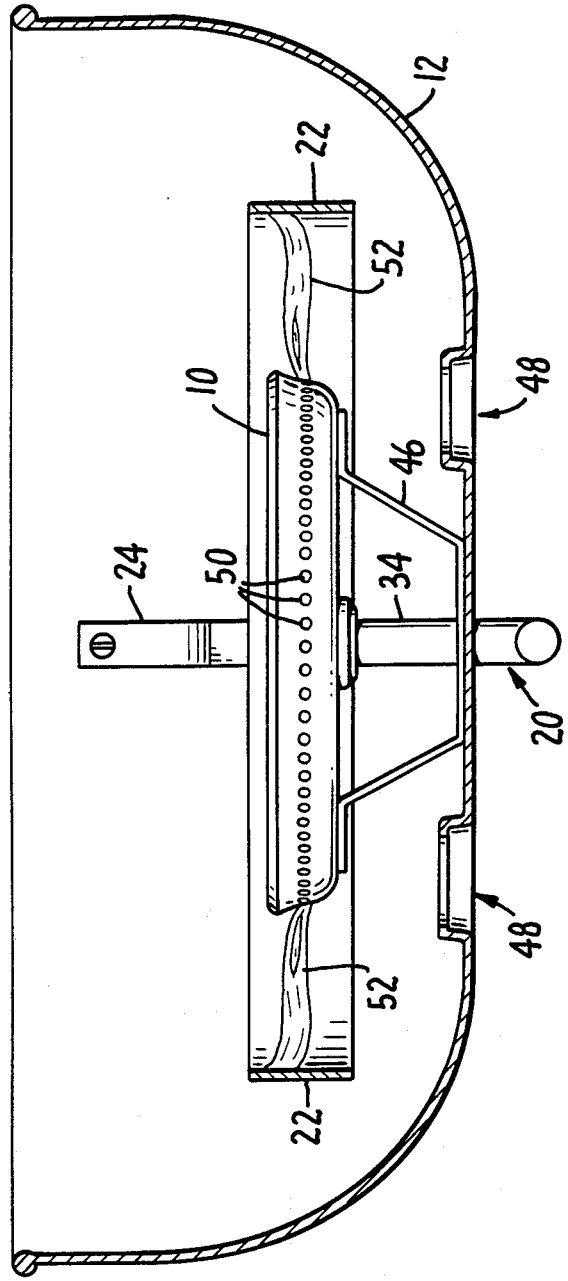
FIG. 3 is a simplified, enlarged cut-away view of the gas burner which illustrates the thermal deflection by the deflecting means.

Housing 12 also includes secondary air holes 48 which are formed on the bottom thereof and which permit oxygen to be supplied in the vicinity of burner 10 to aid in combustion. FIG. 3 shows the preferred positioning of secondary air holes 48. Preferably air holes 48 are recessed with respect to the bottom surface of housing 12. By recessing the air holes in a direction toward the gas burner 10, the effects of wind gusts can be minimized while maintaining an adequate supply of air to the vicinity of gas burner 10.

Referring to FIGS. 1 and 3, ring 22 will now be described in greater detail. As can be seen from FIG. 3, gas burner 10 includes a plurality of ports 50, from which the gas fuel is emitted. When the gas fuel is ignited, a flame pattern such as shown by flames 52 results. In the absence of ring 22, the flame pattern is substantially horizontal with respect to burner 10. As result much of the heat emitted from the flame pattern is absorbed in the walls of housing 12. This results in a significant loss of heat through housing 12. Because housing 12 absorbs such a large amount of heat, special consideration is required regarding the types of coatings used to prevent early deterioration thereof. This results in higher manufacturing costs and additional complexity in the cooker design.

It has been found that, by positioning the thermal deflector, such as ring 22, to be spaced apart from gas burner 10 and so that the heat is deflected toward the object to be heated, a higher heat flux density can be achieved. In effect, the thermal deflector provides heat deflecting and reflecting faces which divert heat flux away from housing 12.

In the preferred embodiment of the present invention the heat deflecting/reflecting faces are preferably positioned so that the tips of flame 52 come into contact with such faces, see FIG. 3. This often causes the flame to be physically deflected in an outward direction. The ring 22 absorbs heat, which it in turn creates thermal currents which flow upward about the faces of ring 22. Preferably deflector ring 22 is made of a stainless steel strip having a width adjusted according to the design of the burner, and is typically between $\frac{3}{4}''$ and $1''$. The ring can be constructed of other heat resistant materials.

It is to be understood that while a specific dimension for the ring is shown, other ring widths and diameters can be utilized in the spirit of the invention so long as the effect of such structures is to cause the heat to be deflected in the direction of the object to be heated.

Unlike housing 12, thermal deflective ring 22 does not act as a heat sink. Thus, when heat is absorbed by thermal deflective ring 22 such heat is not dissipated so as to be lost. Instead, the heat is reradiated by ring 22 to generate thermal currents which otherwise may be lost through housing 12, and thereby to add to the total heat flux which is applied to the object to be heated.

Figure 5B:
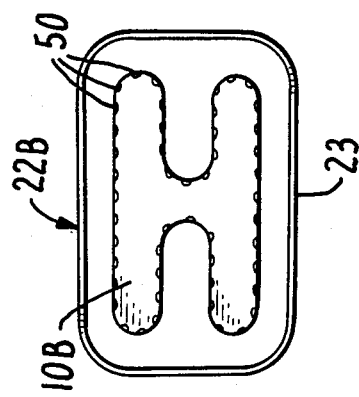
FIGS. 5a and 5b illustrate deflecting structures for different configurations of gas burners.
Figure 5A:
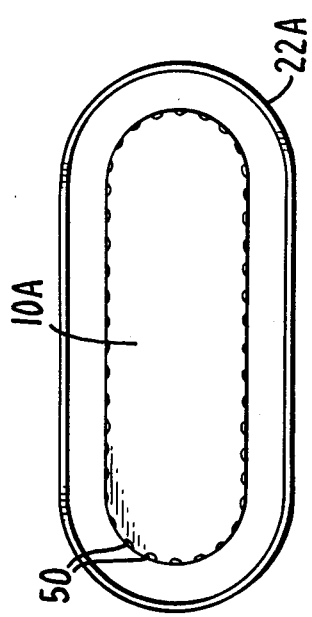

FIGS. 5a and 5b illustrate the shapes of the thermal deflective ring for different shapes of gas burners. In FIG. 5a, bar burner 10a has an elongated shape. Accordingly, ring 22a has an elongated shape.

In FIG. 5b, burner 10b has an H-shape. In turn, thermal deflective ring 22b has a perimeter portion 23 which is positione about the periphery of gas burner 10b.

As can be seen from FIGS. 3, 5A and 5B, the ring of the present invention provides a face transverse to the direction at which the flames from the burner are emitted, which face is spaced apart from the burner so that air flow in the region between the burner and the ring is substantially unobstructed.

With the improved gas cooker of the present invention there is a significant reduction in heat lost through the housing 12 that surrounds gas burner 10. The effect of thermal deflective ring 22 is to increase the amount of heat directed to the object to be heated whereby the amount of heat provided to the object to be heated goes up more rapidly than it would without the thermal deflector ring 22. One indication of the quantity of heat delivered to the object to the heated is the surface temperature of the housing of the cooker.

The results of an experiment conducted on a gas cooker with and without the thermal deflector ring 22 are shown in FIG. 4. In FIG. 4 the broken line curves represent the temperature of housing 12 with the container 28 positioned above the burner 10, with (curve 60) and without (curve 62) thermal deflector ring 22. The solid line curves represent the temperature of the housing surface without the container 28, with (curve 64) and without (curve 66) the thermal deflecting ring 22. The vertical axis is in degrees centigrade while the horizontal axis is in time in units of minutes.

From these curves it can be seen that there is a significant and consistent temperature drop at the surface of the housing when the thermal deflector 22 is in place. This temperature drop is nearly fifty (50) degrees in centigrade when container 22 is not present, and is nearly forty (40) degrees in centigrade when container 22 is present.

As a further indication of the increased efficiency of the improved gas cooker, the amount of time required to boil 10 quarts of water was measured. For a gas cooker having a rating of 30,000 BTUs, 17 minutes were required to boil the water where no thermal deflective ring 22 was used. When the thermal deflective ring was used only 15 minutes and 30 seconds of time was required to boil the water.

Further, a similar gas cooker of another design and having a BTU rating of 40,000 took 14 minutes and 50 seconds to boil 10 quarts of water, whereas the present gas cooker-container with the thermal deflector 22 and a BTU rating of 30,000 took 15 minutes and 30 seconds to boil the same amount of water, under otherwise identical testing conditions.

A further advantage of the present invention is that the ring acts as an effective wind shield. Where the portable cooker is used in the presence of wind, the ring reduces the effect of the wind on the heat from gas burner 10. For example, it is often the case the prior gas cookers (or so-called fish cookers) are not effective in boiling water when used on the seashore. However, with the use of the thermal deflective ring 22, water can be boiled effectively there. Further enhancing this water boiling capability are the use of the recessed secondary air holes 48 as well as the selection of the positioning of arms 24 with respect to burner 10. With respect to the latter feature, preferably the diameter of lower portion 32 of container 28 is selected to be slightly less than the separation between arms 24. This tends to concentrate the heat from burner 10 about the lower portion 32 of container 28.

Another advantage of the present invention is that because of the lower surface temperatures of the housing, the protective surface coating of the housing will last much longer. Alternatively, the lower temperature grade of material can be used to coat the housing. This leads to lower costs in manufacturing the improved gas cooker.

Furthermore with the selection of diameter of the upper portion 30 of container 28 and the removable characteristic of legs 14, the entire housing containing the burner 10 and legs 14 can be placed inside container 28. Handles 68 and lid 70 of container 28 permit easy transportation of the pot and contained cooker.

The terms and expressions which have been employed herein are used as terms of description and not of limitation, and there is no intention, in the use of such terms and expressions, of excluding equivalents of the features shown and described, or portions thereof, it being recognized that various modifications are possible within the scope of the invention claimed

I claim:

1. An improved gas cooker for heating objects of the type including a housing, a gas burner fuel to the gas burner, wherein the gas burner includes a plurality of apertures from which the gas fuel can be emitted for combustion in the form of a flame which supplies heat, the improvement comprising
    means positioned apart from the gas burner and opposite the apertures for deflecting the heat towad the object to be heated comprising a ring having a face about its perimeter; and
    a plurality of arms connected to and exending between the housing and the ring for supportig the ring relative o the housing and gas burner, wherein said ring is positioned about and spaced apart from the periphery of the gas burner so that said face is transverse to the direction in which the flame is emitted from the gas burner and so that air flow in the region between the gas burner and said face is substantially unobstructed.

2. The improved gas cooker of claim 1 wherein the gas burner is donut shaped and the apertures are positioned about the periphery of the gas burner, and further wherein the heat deflecting means are positioned about the periphery of the gas burner and in the vicinity of the tips of the flame for urgin the flame toward the object to be heated.

3. The improved gas cooker of claim 2 wherein the heat deflecting means absorbs heat from the flame and in response thereto generate thermal currents which flow in the direction of the object to be heated.

4. The improved gas cooker of claim 2 wherein the urging means are positioned with respect to the gas burner so that the tips of the flame come in contact with the ring.

5. The impoved gas cooker of claim 1 wherein the ring is constructed so that its face has a width which is substantially equal to or larger than the width of the gas burner and thickness which is substantially less than the thickness of the face.

6. The improved gas cooker of claim 5 wherein the ring is formed from a strip of heat resistant material which is supported from the housing.

7. The improved gas cooker of claim 6 wherein the heat deflecting material is stainless steel.

8. The improved gas cooker of claim 6 wherein the strip is approximately one inch wide and approximately one tenth of an inch thick.

9. The improved gas cooker of claim 1 further including
    a removably mountable base for supporting the housing; and
    container means having an upper portion and a lower portion for storing the housing in the upper portion when the gas cooker is not in use, and for holding the object to be heated when the gas cooker is in use, wherein the width of the upper portion is selected to be greater than the width of the housing, and the width of the lower portion is selected to be less than the width of the housing.

10. The improved gas cooker of claim 9 wherein the container means are a pot.

* * * * *